United States Patent
Rios, III et al.

(10) Patent No.: US 10,540,348 B2
(45) Date of Patent: Jan. 21, 2020

(54) CONTEXTUAL INFERENCE OF NON-VERBAL EXPRESSIONS

(71) Applicant: AT&T Intellectual Property I, L.P., Atlanta, GA (US)

(72) Inventors: Roque Rios, III, Middletown, NJ (US); Kenneth Walsh, Point Pleasant, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 716 days.

(21) Appl. No.: 14/492,438

(22) Filed: Sep. 22, 2014

(65) Prior Publication Data

US 2016/0085802 A1  Mar. 24, 2016

(51) Int. Cl.
*G06Q 30/02* (2012.01)
*G06F 16/245* (2019.01)
*H04L 29/06* (2006.01)
*H04W 12/06* (2009.01)
*H04W 12/00* (2009.01)

(52) U.S. Cl.
CPC ....... *G06F 16/245* (2019.01); *G06Q 30/0269* (2013.01); *H04L 63/0861* (2013.01); *H04W 12/06* (2013.01); *H04W 12/00508* (2019.01)

(58) Field of Classification Search
CPC .................................................. G06Q 30/0269
USPC ...................................................... 705/14.66
See application file for complete search history.

(56) References Cited

U.S. PATENT DOCUMENTS

| | | | |
|---|---|---|---|
| 7,106,204 B2 | 9/2006 | Pilu et al. | |
| 7,636,794 B2 | 12/2009 | Ramos et al. | |
| 8,150,384 B2 | 4/2012 | Abifaker et al. | |
| 8,341,558 B2 | 12/2012 | Li | |
| 8,370,106 B2 | 2/2013 | Shkolnikov et al. | |
| 8,581,844 B2 | 11/2013 | Ho et al. | |
| 8,648,799 B1 | 2/2014 | Lloyd | |
| 2009/0265671 A1 | 10/2009 | Sachs et al. | |
| 2011/0181422 A1* | 7/2011 | Tran .................. | G06F 19/3418 340/573.1 |
| 2012/0056801 A1 | 3/2012 | Bevilacqua et al. | |
| 2012/0058783 A1 | 3/2012 | Kim et al. | |
| 2012/0151420 A1 | 6/2012 | Amento et al. | |
| 2012/0262372 A1 | 10/2012 | Kim et al. | |
| 2012/0272194 A1 | 10/2012 | Yang et al. | |
| 2012/0280905 A1 | 11/2012 | Vonog et al. | |

(Continued)

FOREIGN PATENT DOCUMENTS

| | | |
|---|---|---|
| WO | 2012112561 A1 | 8/2012 |
| WO | 2014110104 A1 | 7/2014 |

OTHER PUBLICATIONS

"How Computers Can Read Body Language," Oct. 22, 2010, downloaded from the Internet at http://ec.europa.eu/research/infocentre/article_en.cfm?id=/research/headlines/news/article_10_10_22_en.html&item=&artid=, 3 pgs.

(Continued)

*Primary Examiner* — Azam A Ansari
(74) *Attorney, Agent, or Firm* — Chiesa Shahinian & Giantomasi PC

(57) ABSTRACT

Contextual awareness is used to reveal non-verbal expressions. A current context of a device is evaluated to infer a user's body posture and emotional state. The user's body posture and emotional state may then be used for improved services and targeted advertising.

20 Claims, 19 Drawing Sheets

(56) References Cited

U.S. PATENT DOCUMENTS

| | | | |
|---|---|---|---|
| 2012/0306770 A1 | 12/2012 | Moore et al. | |
| 2013/0159350 A1 | 6/2013 | Sankar et al. | |
| 2014/0009256 A1 | 1/2014 | Dubovik | |
| 2014/0107531 A1 | 4/2014 | Baldwin | |
| 2014/0310764 A1* | 10/2014 | Tippett | G06F 21/31 726/1 |
| 2015/0120465 A1* | 4/2015 | Baldwin | G06Q 30/0269 705/14.67 |
| 2015/0317076 A1* | 11/2015 | Goel | G06F 3/0488 345/173 |

OTHER PUBLICATIONS

"Computer Processing of Body Language," Nov. 2010, downloaded from the Internet at https://en.m.wikipedia.org/wiki/Computer_processing_of_body_language, 6 pgs.

Bernhardt, Daniel, "Emotion Inference from Human Body Motion," Oct. 2010, University of Cambridge, Technical Report No. 787, 227 pgs.

Castellano et al., "Recognising Human Emotions from Body Movement and Gesture Dynamics," 2007, Lecture Notes in Computer Science vol. 4738, 2007, pp. 71-82.

Niezen et al., "Gesture Recognition as Ubiquitous Input for Mobile Phones," Sep. 21, 2008, UbiComp '08 Workshop W1—Devices that Alter Perception (DAP 2008), pp. 17-21.

Scott et al., "Sensing Foot Gestures from the Pocket," Oct. 3-6, 2010, UIST '10 Proceedings of the 23nd annual ACM Symposium on User interface Software and Technology, 10 pgs.

Vajk et al., "Using a Mobile Phone as a 'Wii-Like' Controller for Playing Games on a Large Public Display," 2008, International Journal of Computer Games Technology vol. 2008, Article ID 539078, 7 pgs.

Kumar, Ankit, "Digital body language," May 24, 2013, downloaded from the Internet at http://tecnicambalandias.blogspot.com/2013/06/digital-body-language.html, 4 pgs.

Amento et al., "The Sound of One Hand: A Wrist-Mounted Bio-Acoustic Fingertip Gesture Interface," Apr. 20-25, 2002, CHI EA '02 CHI '02 Extended Abstracts on Human Factors in Computing Systems, 2 pgs.

Tundo, Marco D., Edward Lemaire, and Natalie Baddour. "Correcting Smartphone orientation for accelerometer-based analysis." *Medical Measurements and Applications Proceedings (MeMeA), 2013 IEEE International Symposium on.* IEEE, 2013.

Alanezi, Khaled, and Shivakant Mishra. "Impact of Smartphone Position on Sensor Values and Context Discovery." May 1, 2013.

* cited by examiner

CONTEXTUAL INFERENCE OF NON-VERBAL EXPRESSIONS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Mobile communications have revolutionized our lives. As we use our mobile devices, massive amounts of information are gathered for analysis. Yet all this information still does not describe our non-verbal body language, which reveals important clues to our feelings and intentions.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
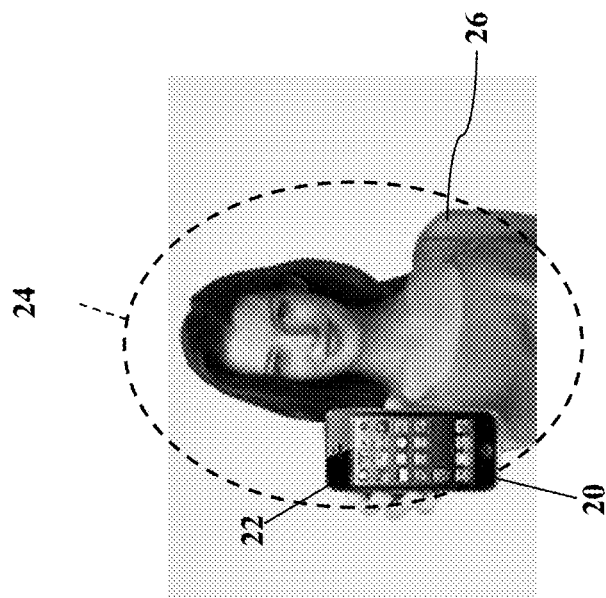
FIGS. 1-4 are simplified schematics illustrating an environment in which exemplary embodiments may be implemented.

FIGS. 1-4 are simplified schematics illustrating an environment in which exemplary embodiments may be implemented. FIG. 1 illustrates contextual inference of user's non-verbal body language, based on her device 20. The device 20, for simplicity, is illustrated as a mobile smartphone 22. The device 20, however, may be any mobile or stationary processor-controlled device (as later paragraphs will explain). Regardless, as the device 20 operates, exemplary embodiments infer the user's mood, feelings, intentions, and other non-verbal body language 24. That is, as the user holds and uses the device 20, exemplary embodiments may infer her body position, mood, feelings, and other non-verbal body language 24, based on that usage.

As the reader likely understands, the user's body language 24 may be an important communicative component. Physical behavior can reveal the user's unspoken feelings and intentions. Indeed, our body language 24, such as the user's posture 26 while holding the device 20, provides clues to our true thoughts, despite our spoken words. How the user holds the device 20, for example, may be indicative of aggression, relaxation, or even boredom. Usage or movement of the device 20 may indicate the user is amused or irritated by conversation. Exemplary embodiments thus infer the user's body language 24, based on information from the user's device 20.

Figure 2:
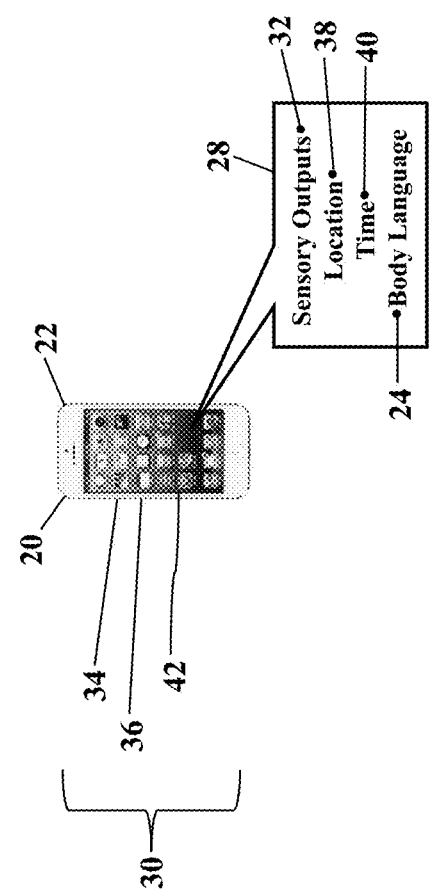

As FIG. 2 illustrates, exemplary embodiments may use context 28. As those of ordinary skill understand, as the mobile smartphone 22 is carried and used throughout the day, various sensors 30 obtain sensory outputs 32. For example, as the smartphone 22 is carried and used, outputs change from an accelerometer 34 and/or from a camera 36. These outputs may be used as clues to the user's anger or calmness or physical expressions. The location 38 and time

40 of usage (such as derived from GPS signals) may also help infer the user's body language 24. The output from a touch screen 42 may also reveal important clues as to the user's body language 24. Whatever sensory outputs are gathered, the sensory outputs 32 are evaluated to determine the current context 28 of the user's device 20. The current context 28 may then be used to infer the user's body language 24.

Figure 3:
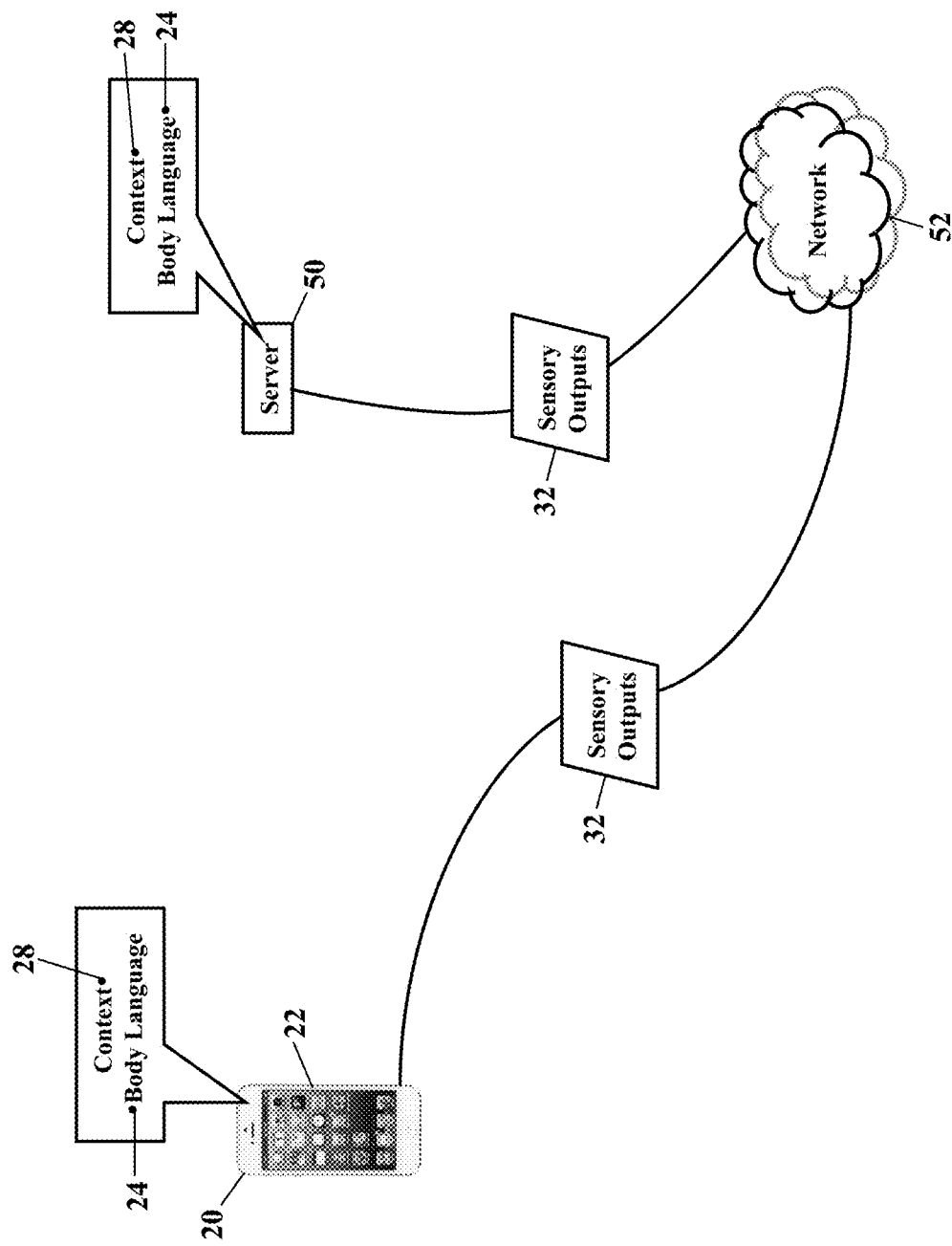

FIG. 3 further illustrates the operating environment. However the current context 28 is determined, the user's body language 24 may be locally or remotely inferred. The user's smartphone 22, for example, may locally determine its context 28 and infer the user's body language 24. However, the user's device 20 may communicate with a remote server 50 using a communications network 52. The user's device 20 may send any of its sensory outputs 32 to the server 50 for analysis. The server 50, in other words, may participate and partially or fully determine the context 28 and/or the user's body language 24, based on the sensory outputs 32 sent from the device 20. The server 50, for example, may be a solution for service providers and sellers to enhance their offerings according to the user's body language 24.

Exemplary embodiments may thus enhance profiling efforts. Body language often reveals more about the user than her verbal words. The non-verbal body language 24 may thus offer a deeper gateway into the thoughts and emotions of the user at a particular time. Exemplary embodiments thus provide a new ability to infer the user's body language 24 during general activities, such as phone calls, work routines, grocery shopping, and other everyday moments. Profiling is improved, thus enhancing products and services targeted to the user based on her mood, feelings, and other emotions.

Figure 4:
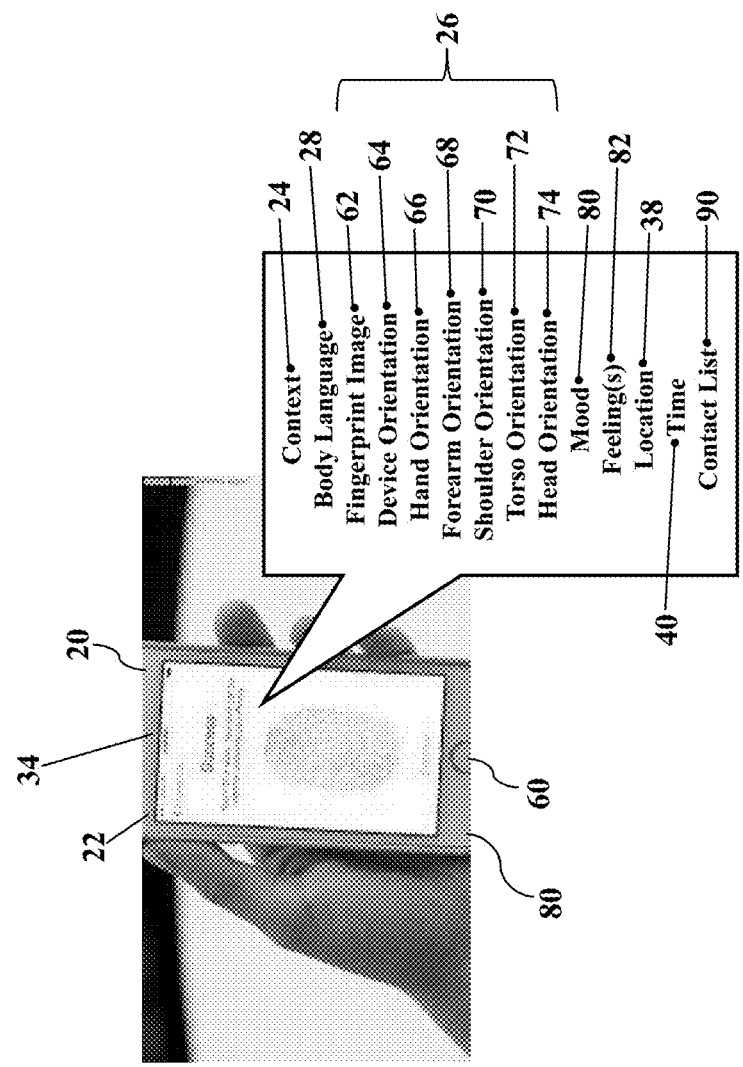

FIG. 4 illustrates one example. As the user holds her device 20, her finger or thumb may contact a fingerprint scanner 60. As the reader may know, many smartphones have the fingerprint scanner 60 as a security measure. If the user's fingerprint matches a template, the smartphone 22 may be unlocked and used. Here, though, the fingerprint scanner 60 may also be used to infer the user's body language 24. As the user holds her device 20, a fingerprint image 62 may thus be captured. The fingerprint image 62 may be compared to templates of the user's human fingers and thumb. A match identifies one of the user's fingers or thumb of the left hand or right hand. Once the user's finger or thumb is identified, the fingerprint image 62 may then be analyzed to determine not only a device orientation 64 of the device 20, but also a hand orientation 66 of the user's hand. The user's fingerprint, in other words, reveals the orientation of the user's finger or thumb and, thus, the user's right or left hand. When combined with a gravitational output from the accelerometer 34, the fingerprint image 62 reveals whether the user's hand is oriented right side up, sideways, or upside down.

Further inferences may be made. Once the user's hand orientation 66 is known, the user's body posture 26 may also be inferred. For example, the human hand has a limited range of movement (e.g., yaw, pitch, and roll axes or vectors) related to the forearm and shoulder. The user's hand, in other words, has a kinematic relation to the human arm and body. So, once the user's hand orientation 66 is known, a forearm orientation 68 and a shoulder orientation 70 may be inferred. Further inferences may be made for the user's torso (e.g., a torso orientation 72), the user's head (a head orientation 74), and the user's overall posture 26. The user's hand orientation 66, in other words, may be used to help infer how the device 20 is held and, thus, the user's body posture 26.

Still more inferences may be made. The user's body posture 26 may further reveal her mood 80 and feelings 82. Consider, for example, if the location 38 repetitively changes during conversation (such as a call or text session). If repetitive or cyclical human movement is observed, the user may be pacing back and forth, perhaps indicating a worried or concerned mood 80. However, if the overall posture 26 indicates the user is upside down, perhaps the user is happily swinging from a tree limb. If the accelerometer 34 outputs values indicating a back and forth shaking movement, with an erect body posture 26, perhaps the user's mood 80 is agitated. If the location 38 is stationary and the user's body posture 26 is determined slouched, perhaps the user's mood 80 is relaxed. If the output from a microphone 80 further indicates little or no verbal input, the user's mood 80 may be boredom.

Other determinations may be considered. For example, the portrait or landscape device orientation 64 of the user's device 20 may augment or refine the inferences. The hand orientation 66 of the user's hand, combined with the device orientation 64 of the user's device 20, may confirm the user's body posture 26. The accelerometer 34 outputs values, when combined with the location 38, the time 40, and the body posture 26, may be used to infer the user is laying in bed in a relaxed mood 80. However, if the sensory outputs 32 indicate the device 20 is sandwiched between her shoulder and ear, the user's mood 80 and feelings 82 may be disinterested boredom. If the device 20 is lying face-up in a speaker mode of operation, the user may be multi-tasking and thus partially mentally disengaged. The various sensory outputs 32 may thus be used to infer the user's posture 26, body language 24, mood 80, and feelings 82.

Exemplary embodiments thus create a new and valuable profiling mechanism. Exemplary embodiments may be used to infer how busy or stressful the user's life situation may be (or at least how the user believes it to be). Exemplary embodiments reveal active engagement with entries in the user's contact list 90, verses those people with whom the user forces interaction. All these different indications of body language 24 may be used to enhance products and services tailored to the user of the device 20. Moreover, exemplary embodiments may be used for ergonomic design, revealing different body postures 26 for different usage scenarios.

Figure 5:
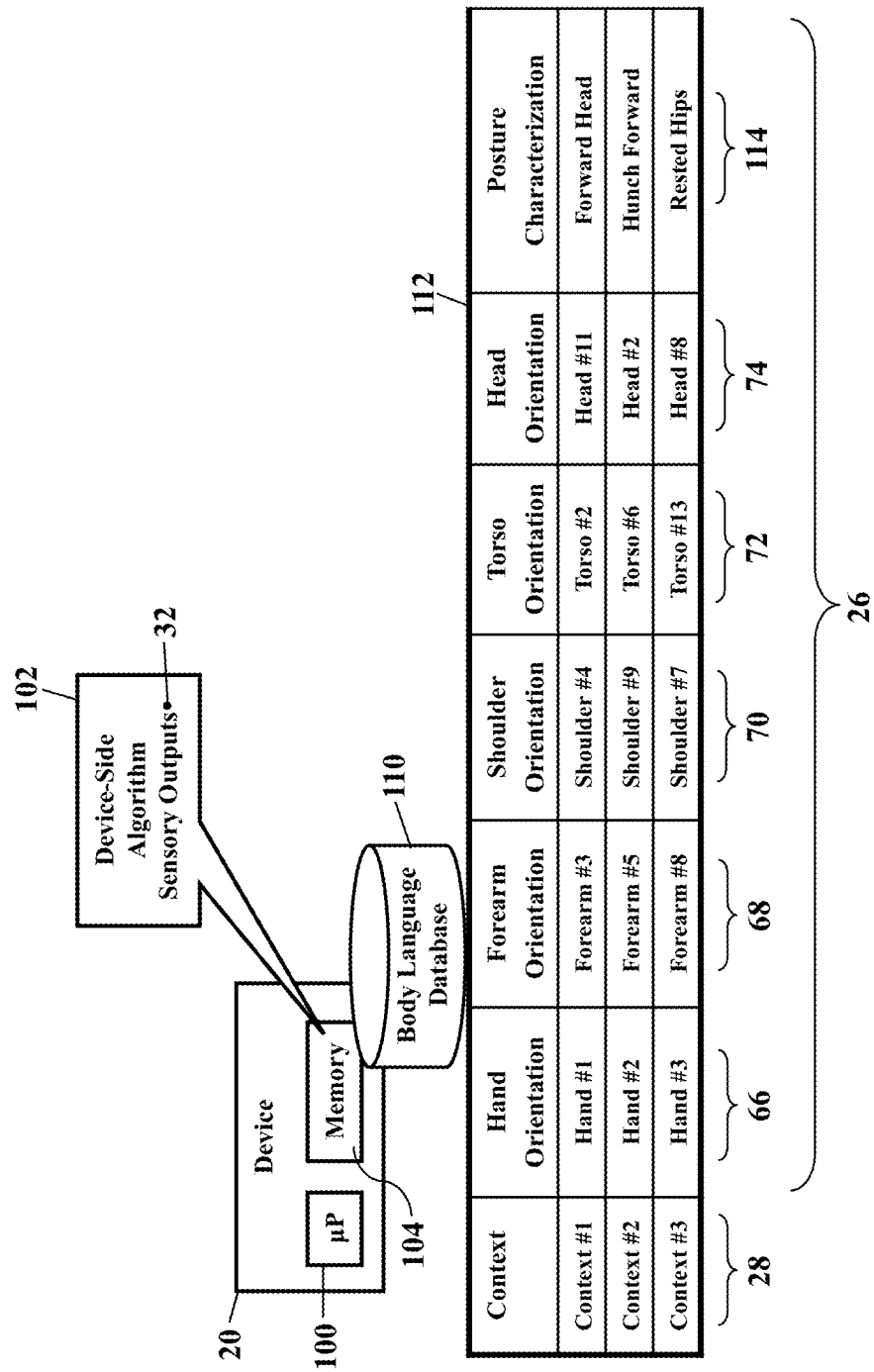
FIGS. 5-9 are more detailed block diagrams illustrating the operating environment.

FIGS. 5-9 are more detailed block diagrams illustrating the operating environment. The user's device 20 has a processor 100 (e.g., "μP"), application specific integrated circuit (ASIC), or other component that executes a device-side algorithm 102 stored in a local memory 104. The device-side algorithm 102 instructs the processor 100 to perform operations, such as evaluating the sensory outputs 32 to determine the current context 28 associated with the user's device 20. Once the current context 28 is determined, the device-side algorithm 102 may instruct the processor 100 to query a body language database 110. FIG. 5 illustrates the body language database 110 locally stored in the memory 104 of the device 20, but the body language database 110 may be remotely located and maintained. The body language database 110 is illustrated as a table 112 that maps, relates, or associates different contexts 28 to different body postures 26. The body language database 110, for example, associates the current context 28 of the user's device 20 to the corresponding hand orientation 66, the forearm orientation 68, the shoulder orientation 70, the torso orientation 72, the head orientation 74, and/or an overall characterization 114 of the body posture 26. The body language database 110 may thus be populated with entries for many different operational contexts 28 of the client device 20. While FIG. 5 only illustrates a few entries, in practice the body language database 110 may contain as many entries as a user, or a service provider, wishes to define. There may thus be many different orientations of different body components, whether human or animal or machine, depending on how the contexts 28 are categorized, valued, or delineated. Once the context 28 is determined, the device-side algorithm 102 instructs the processor 100 to retrieve one or more of the corresponding body postures 26. That is, if the current context 28 of the device 20 matches one of the entries in the body language database 110, the device-side algorithm 102 may retrieve the corresponding component orientations and/or the overall characterization 114.

Figure 6:
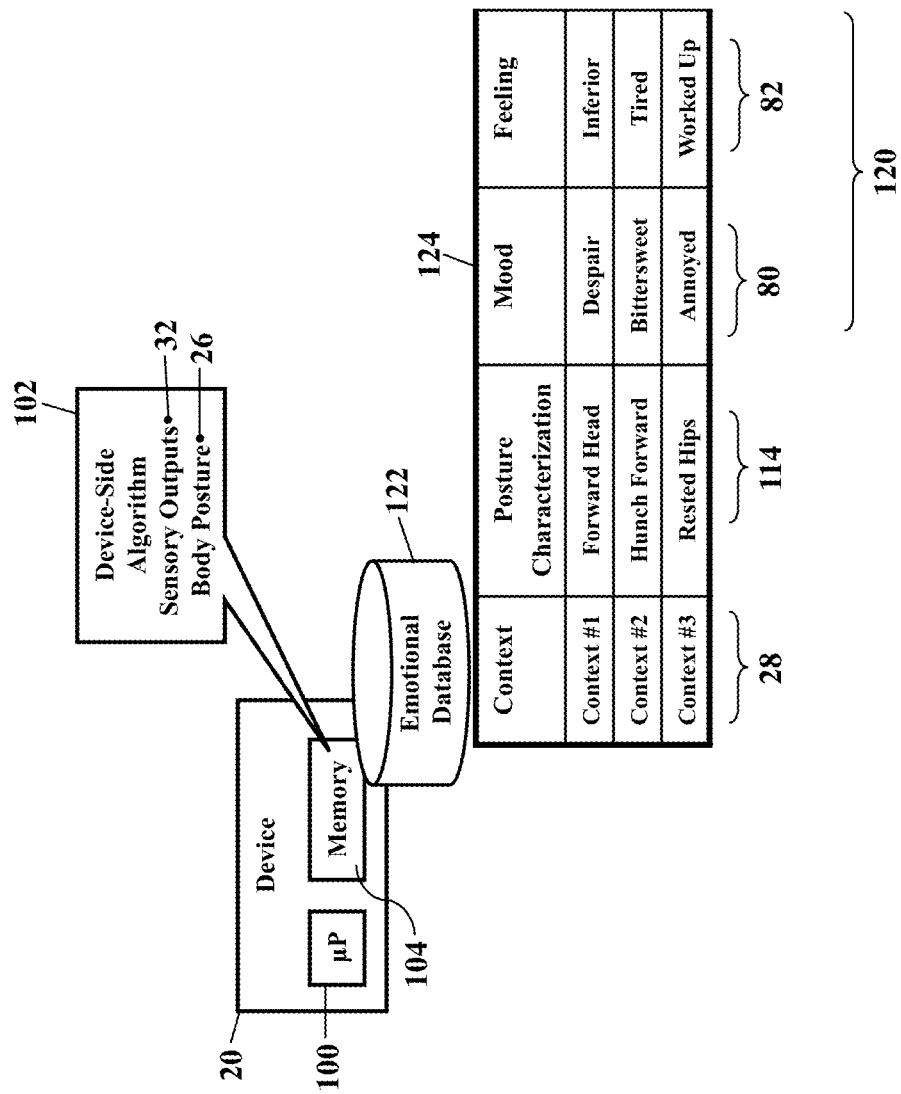

FIG. 6 illustrates further inferences. As this disclosure previously explained, the context 28 and the body posture 26 may be used to further infer the user's mood 80, feelings 82, and any other measure or descriptor of emotional state 120. FIG. 6 thus illustrates an emotional database 122 that builds upon the knowledge of the context 28 and the body posture 26. The emotional database 122 is also illustrated as a table 124 that maps, relates, or associates the different contexts 28 and the different body postures 26 to different emotional states 120. FIG. 6, for simplicity, only illustrates the overall characterization 114 of the user's body posture 26, but the emotional database 122 may have detailed entries for some or all of the different body component orientations illustrated in FIG. 5. The emotional database 122 may thus be populated with entries for many different combinations of the operational contexts 28 of the client device 20 and the different body postures 26. While FIG. 6 only illustrates a few entries, in practice the emotional database 122 may contain many entries fully and richly defining many emotional states 120 based on many different characterizations 114 of the body postures 26. The processor 100 queries the emotional database 122 and retrieves one or more of the corresponding emotional states 120 to determine whether the user is sad, excited, despondent, melancholy, or apathetic.

Figure 7:
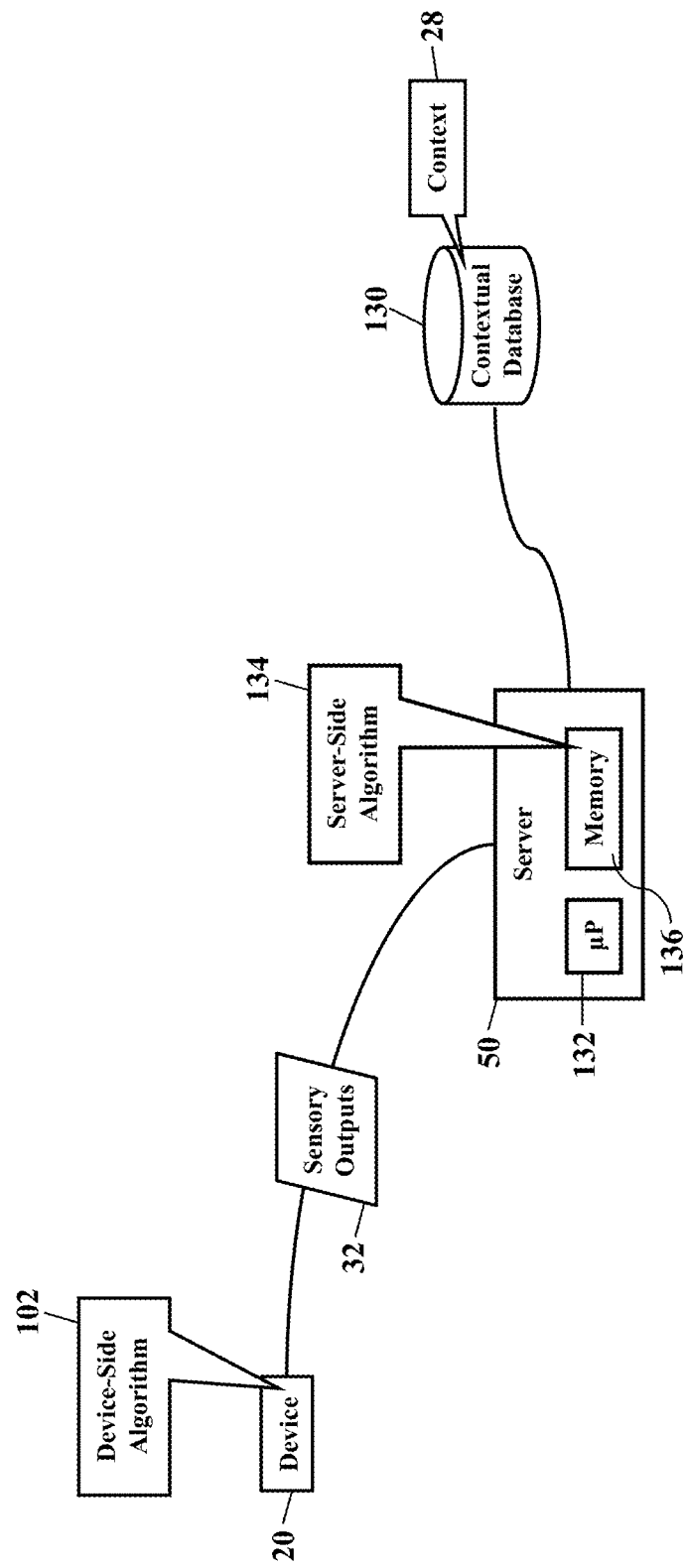
Figure 8:
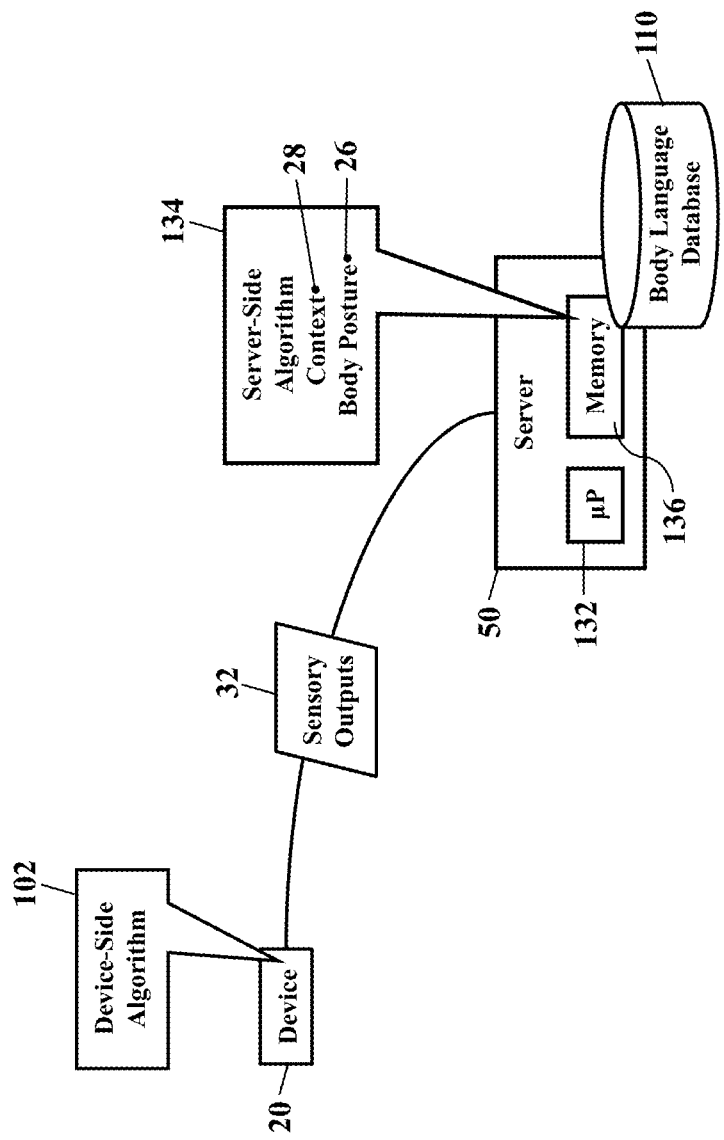
Figure 9:
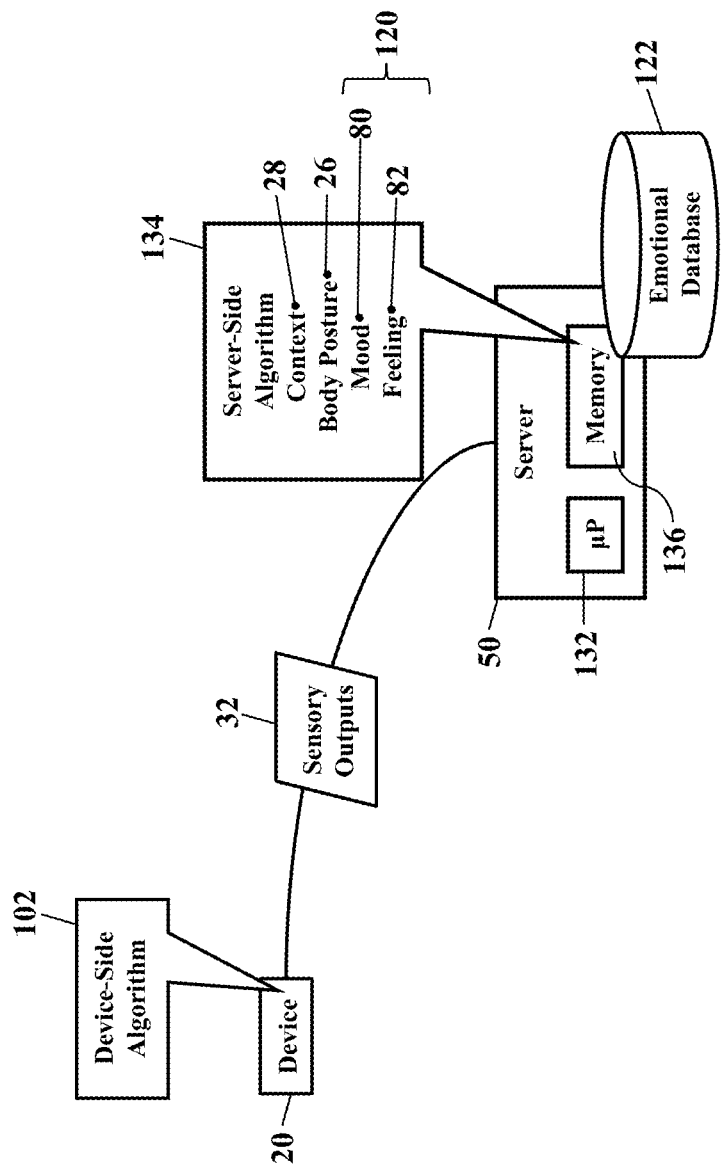

FIGS. 7-9 illustrate a network-based solution. Here exemplary embodiments may offload some or all of the processing to the remote server 50. There may be circumstances when remote processing is preferred over a purely local solution. For example, characterization of the user's body positions and emotions may require large databases having thousands of entries, and mathematically complex algorithms may be involved. The processing and memory requirements may thus be too cumbersome for the capabilities of the user's device 20 and best handled by the server 50. The user's device 20, then, may merely gather the sensory outputs 32 and send them in messages to the network address associated with the server 50.

The server 50 may then consult a contextual database 130. The server 50 has a processor 132 (e.g., "μP"), application specific integrated circuit (ASIC), or other component that executes a server-side algorithm 134 stored in a local memory 136. The server-side algorithm 134 and the device-side algorithm 102 may thus cooperate to emotionally profile the user of the device 20. Once the server 50 receives the sensory outputs 32 sent from the user's device 20, the server-side algorithm 134 instructs its processor 132 to perform operations, such as determining the current context 28 associated with the user's device 20. For example, the processor 132 may query the contextual database 130 for the sensory outputs 32. The contextual database 130 stores different contexts 28 associated with their corresponding sensory outputs 32. The server 50 thus retrieves the context 28 that matches the sensory outputs 32.

FIG. 8 illustrates the body language database 110. Once the context 28 is known, the server 50 may query the body language database 110. Here the body language database 110 is stored in the memory 136 of the server 50. The server-side algorithm 134 instructs the processor 132 to retrieve one or more of the corresponding body postures 26 (and/or the overall characterization 114 illustrated in FIG. 5) that match the current context 28.

FIG. 9 illustrates the emotional database 122. Here again the emotional database 122 is illustrated as being stored in the memory 136 of the server 50. Once the server 50 determines the context 28 and the body posture 26, the server 50 may query the emotional database 122 to further infer the user's mood 80, feelings 82, or other emotional state 120. The server-side algorithm 134 instructs the processor 132 to query the emotional database 122 and retrieve one or more of the corresponding emotional states 120.

Exemplary embodiments thus infer the user's emotions. Exemplary embodiments gather an inventory of any and/or every sensor present on the user's device 20. The user's smartphone 22, for example, may have the camera 36, the accelerometer 34, the touch screen 42, the fingerprint scanner 60, and even tactile or capacitive buttons (all illustrated with reference to FIGS. 2-4). The sensory outputs 32 may be combined and compared to known correlations defined in the body language database 110 and/or the emotional database 122. Exemplary embodiments may thus infer the user's body language 24 and even her emotional state 120. Manufacturers and marketers may thus develop the body language database 110 and/or the emotional database 122 to suit their tactical and strategic purposes. The sensory outputs 32 may be captured and recorded as human test subjects use their devices in all classical/possible/practical positions.

Application programming interfaces (or "APIs") may be defined. The reader may envision that the databases 110 and 122 could contain proprietary information for accurately inferring the users emotional state 120. Indeed, different software developers may code proprietary algorithms for determining the user's emotional state 120, based on different combinations of the sensory outputs 32. APIs may thus permit these developers to define common calls and functions for inferring the user's emotional state 120, without revealing their proprietary algorithms. As the databases 110 and 122 become more richly defined, the developers may infer emotional states from simple, everyday tasks, such as toasting bread, perhaps based on wide usage and feedback.

Exemplary embodiments may be applied regardless of networking environment. Exemplary embodiments may be easily adapted to mobile devices having cellular, WI-FI®, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. The processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 10:
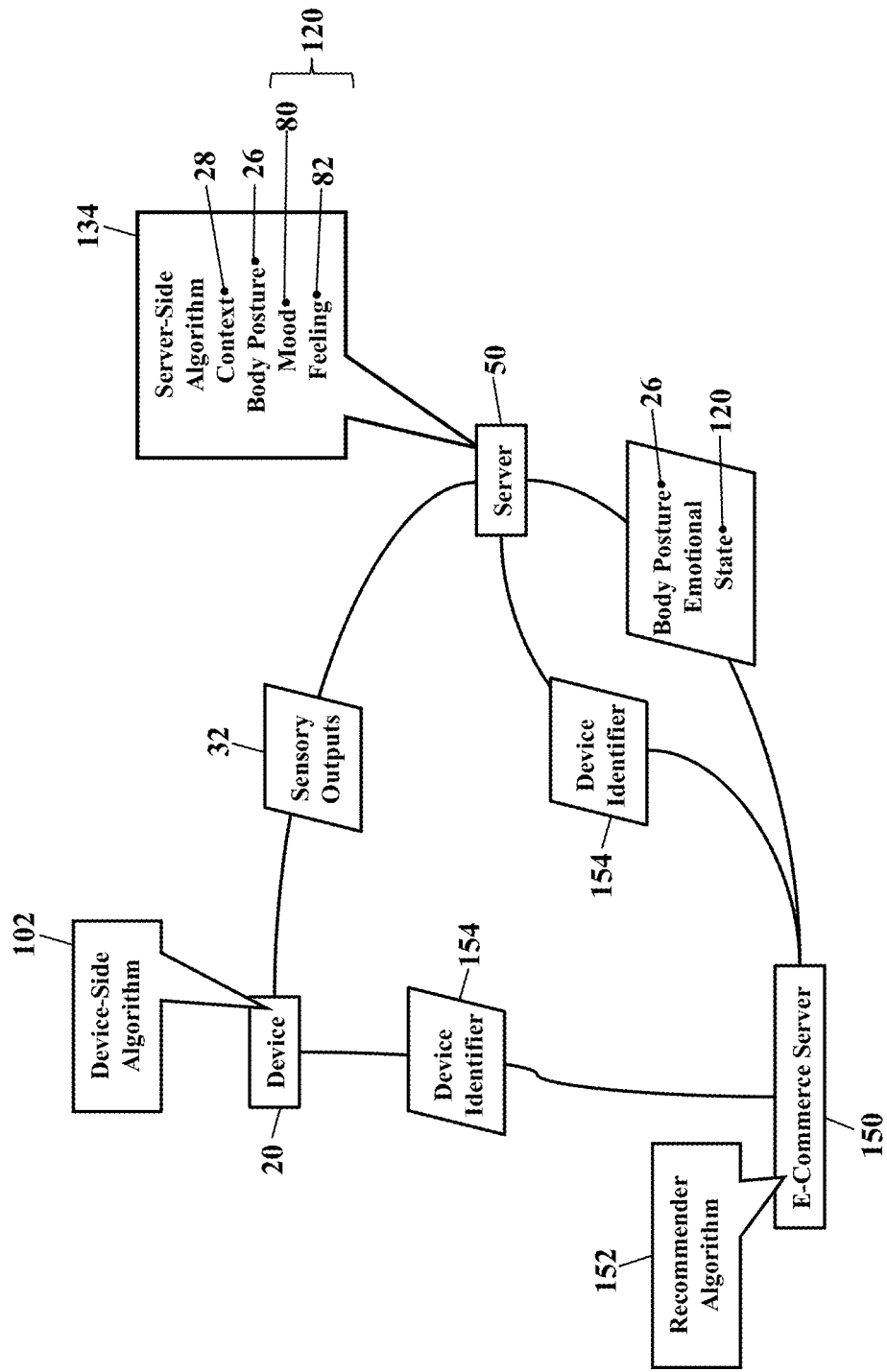
FIG. 10 is a schematic illustrating product recommendations, according to exemplary embodiments.

FIG. 10 is a schematic illustrating product recommendations, according to exemplary embodiments. Once the user's body posture 26 and emotional state 120 are known, this information may be used for product and service recommendations. FIG. 10, for example, illustrates an e-commerce server 150 that interfaces with the user's device 20. As the user's device 20 conducts electronic transactions (e.g., requests and responses) with the e-commerce server 150, the user's body posture 26 and emotional state 120 may be advantageously used for targeted profiling. The e-commerce server 50 may thus request and receive the user's body posture 26 and emotional state 120, as determined by either the user's device 20 and/or the network server 50. Suppose the user's device 20 is browsing an online selection of products or services brokered by the e-commerce server 150. A familiar example may be the user browsing a catalog of items available for purchase from Amazon.com, Inc. If the user's body posture 26 indicates a lower back ailment, a recommender application 152 (perhaps operating in the e-commerce server 150) may recommend heating pads, pillows, chairs, medications, and other items for relieving back pain. If the user's emotional state 120 indicates stress or sadness, the e-commerce server 150 may recommend an uplifting movie or book or even counseling services. Exemplary embodiments, in short, provide a new profiling paradigm without requiring invasive, personalized information and video observance.

The e-commerce server 150 may thus interface with the server 50. As the e-commerce server 150 engages the user's device 20, the user's device may send its unique device identifier 154 to the e-commerce server 150. As those of ordinary skill in the art understand, the device identifier 154 may be any alphanumeric arrangement that uniquely identifies the corresponding device 20, such as an Internet Protocol address, serial number, and/or a machine moniker (e.g., "Bob's tablet"). The e-commerce server 150 may then send the device identifier 154 to the server 50 in a request for characterization. The server 50 receives the device identifier 154 and queries the device 20 for its sensory outputs 32. The server-side algorithm 134 then determines the context 28 and the corresponding body posture 26 and emotional state 120, which are returned to the e-commerce server 150. The recommender application 152 may then target products and services to the user's device 20, based on the user's body posture 26 and emotional state 120.

Profiling may also be based on patterns of usage. As the databases 110 and 122 gain usage and experience, statistics may be monitored for recognized patterns. If usage reveals that ninety percent (90%) of people hold their smartphone 22 in a common orientation or body posture 26, manufacturers of devices may design ergonomic features with widespread acceptance. The databases 110 and 122 may also be mined for unintended design marvels and mistakes. For instance, should antenna problems force users to adopt a new style of holding their smartphone 22, the databases 110 and 122 may immediately reveal changes in usage patterns. Changes in usage between different models may thus be immediately apparent.

Figure 11:
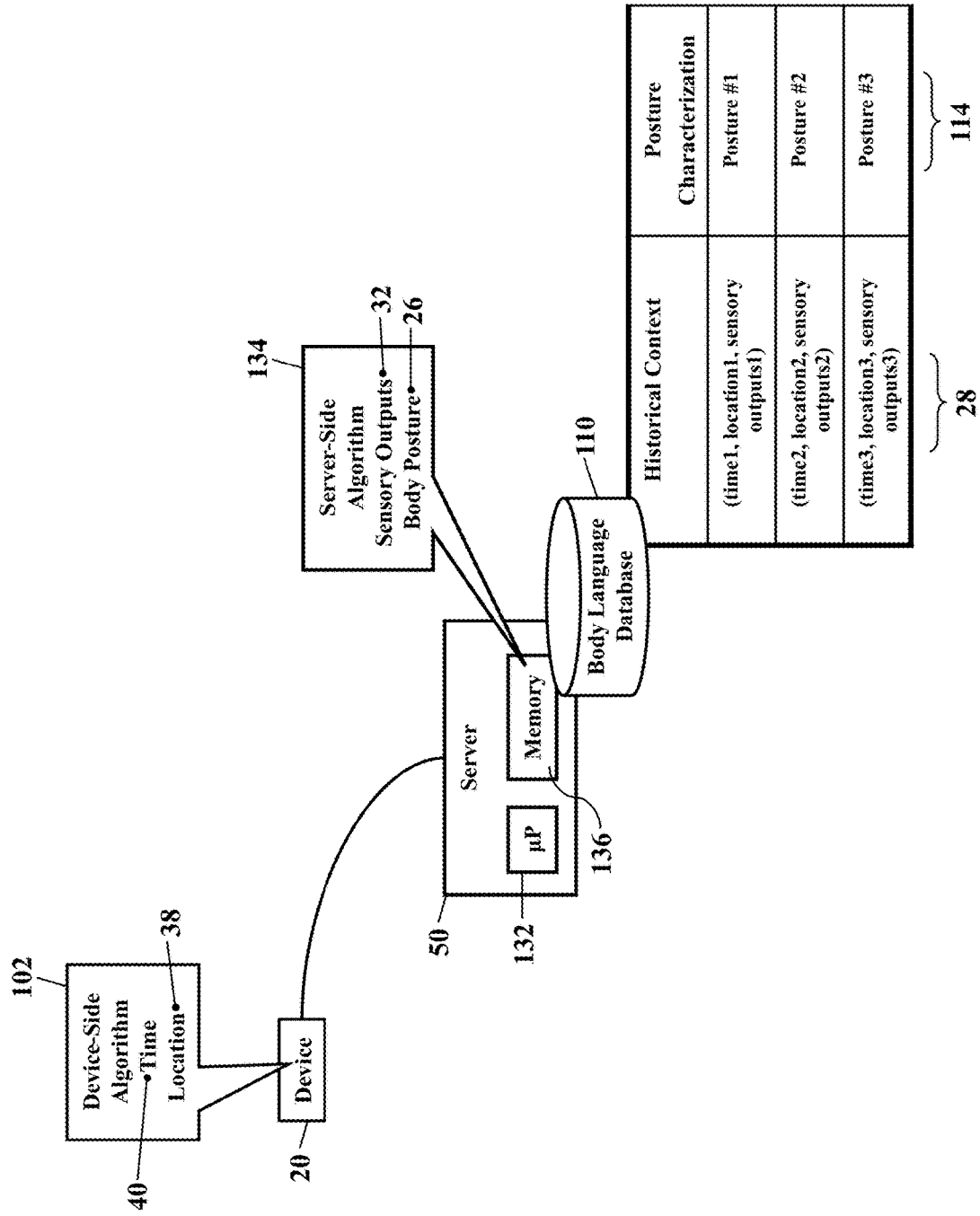
FIGS. 11-13 are schematics illustrating authentication, according to exemplary embodiments.
Figure 12:
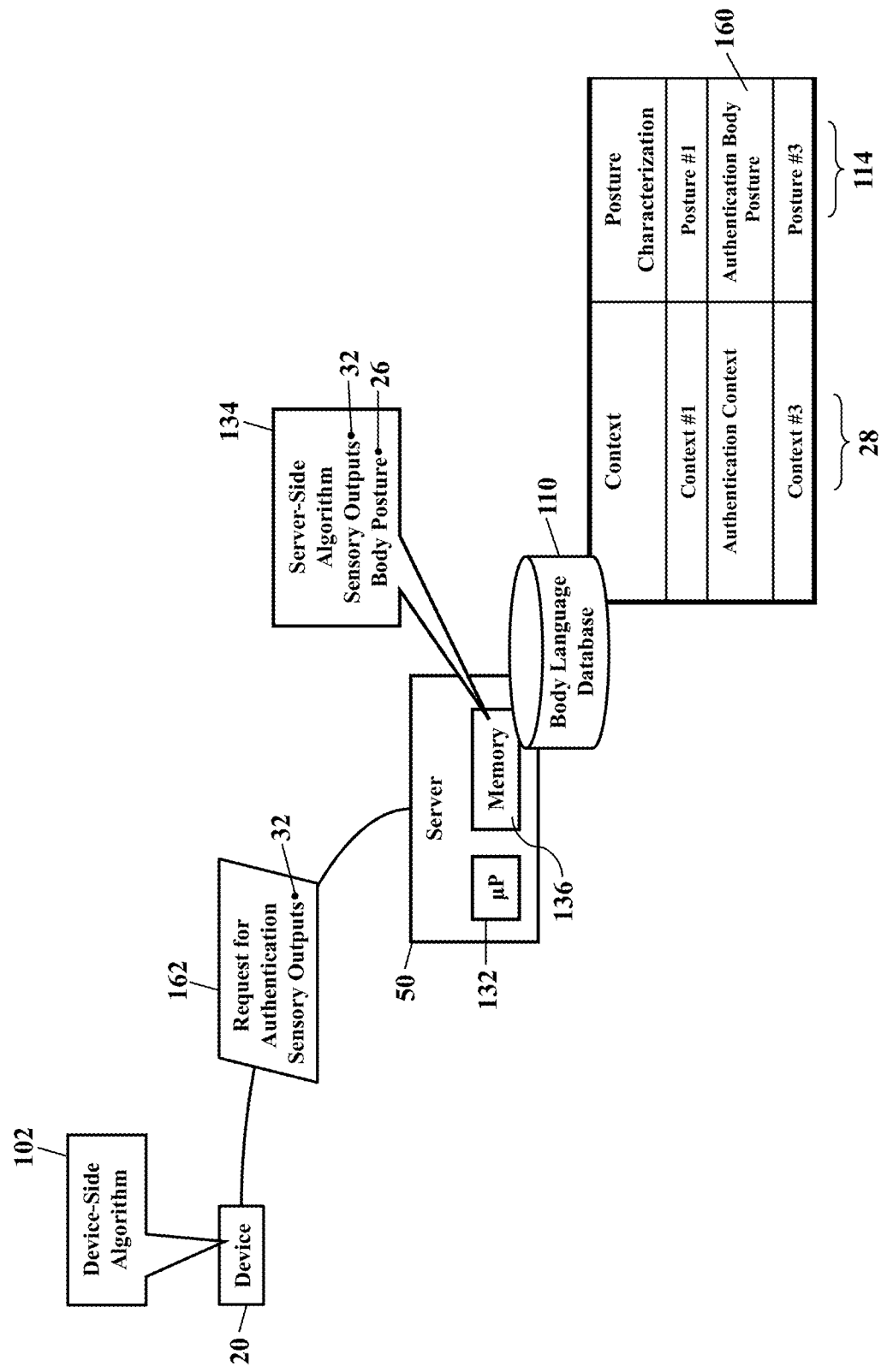
Figure 13:
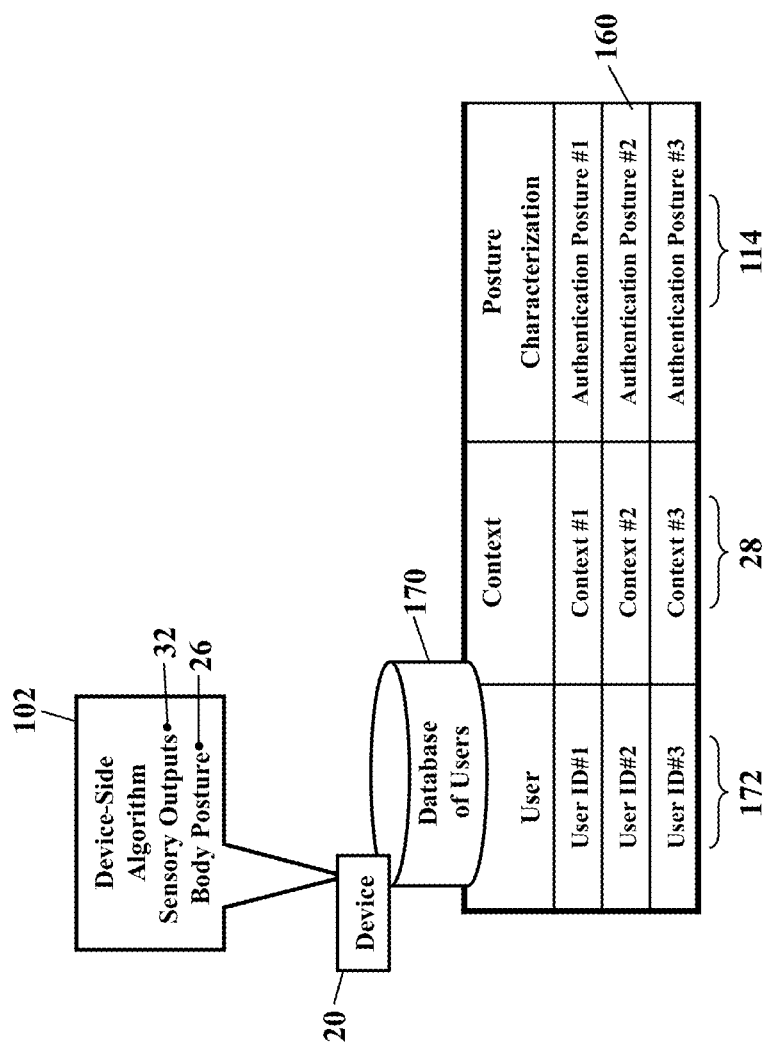

FIGS. 11-13 are schematics illustrating authentication, according to exemplary embodiments. Here the user's body posture 26 may be used to authenticate the user. As the reader may envision, humans are often creatures of habit. We walk the same halls, travel the same paths, and have repeating patterns of usage, especially on a daily basis. Exemplary embodiments, then, may add the user's body posture 26 as a further identification factor. For example, if the device's current location 38, the current time 40, and the user's current body posture 26 match that historically logged in the body language database 110, exemplary embodiments may confirm the identity of the user. Exemplary embodiments, in other words, may track or log the user's inferred body posture 26 at different locations and/or times. FIG. 11 thus illustrates the body language database 110 maintaining a historical log of the different contexts 28 and the corresponding different body postures 26. Over time usage patterns may develop, in which the user habitually uses her device 20 in the same context 28 with the same body posture 26. Whenever the device 20 attempts an authentication, the body language database 110 may be queried for the current context 28 and the user's inferred body posture 26. If the body language database 110 contains a matching entry, then the user of the device 20 may be authenticated without further credentials. However, if no match is found, then perhaps the user might need to enter a username and password or other credential.

Credit card transactions are an example. Suppose the user of the device 20 wishes to purchase some good or service using a credit card number. The user enters the credit card number into a user interface, as is conventionally done. However, as an additional security measure, exemplary embodiments may compare the device's current context 28 and the user's body posture 26 to historical usage logged in the body language database 110. If the user habitually or historically shops online from her favorite beanbag chair, the user's body posture 26 likely matches historical observations. If the user repeatedly eats at the same restaurant, then the same location 38 and body posture 26 may provide reliable, quick, and easy authentication of payment.

FIG. 12 illustrates an authentication body posture 160. Here the user may define a unique one of the body postures 26 that is used for authentication purposes. That is, whenever authentication is required, the user physically assumes the authentication body posture 160. The user's device 20 captures the sensory outputs 32 while the user performs the authentication body posture 160. The sensory outputs 32 are sent to the server 50 in or as part of a request 162 for authentication. The server 50 determines the current context 28 and infers the user's corresponding body posture 26. If the user's body posture 26 matches the unique authentication body posture 160, then the user is authenticated. If the user cannot replicate the authentication body posture 160, further credentials may be required. Exemplary embodiments, then, allow the user to define a pose or position for confirming identity.

Location and time may be ignored. In today's mobile society, electronic authentication is widely accepted for purchasing goods and services. There may be many times, then, when the user wishes to authenticate without regard to location and time. That is, if the user's current location and time are not historically observed in the body language database 110, the user may still want authentication to succeed. The user may thus configure exemplary embodiments to evaluate the current context 28, and thus the user's body posture 26, without regard to the current location and time. The user may thus perform her authentication body posture 160, in a new restaurant or other new location, without fear of a credit card decline.

FIG. 13 illustrates user identification. Here exemplary embodiments may be used to differentiate users. As the reader may again understand, different users may share the device 20. Members of a household, for example, may share a tablet computer. A set-top box may have different profiles, depending on the viewer. Whatever the device 20, the user's body posture 26 may differentiate sharing users. Whenever the device 20 is used, its current context 28 is determined (from the sensory outputs 32) and the user's body posture 26 is inferred (as above explained). Exemplary embodiments may then query a database 170 of users for a match. The database 170 of users stores different user identifiers 172 to their corresponding different contexts 28 and authentication body postures 160. As the user holds the device 20, the current context 28 is determined and the user's body posture 26 inferred. The database 170 of users may then be queried and the corresponding user identifier 172 is retrieved. Because the user identifier 172 uniquely identifies one of the sharing users, the device 20 may thus assume a configuration associated with the user identifier 172. More simply, the current user may even perform her authentication body posture 160, which may uniquely differentiate her from the other users' authentication body postures. If her authentication body posture 160 is matched to an entry in the database 170 of users, the device 20 may assume the corresponding configuration.

Personality traits may also be differentiated. Whenever the body posture 26 uniquely identifies the current user, the user's emotional state 120 may also be determined from the emotional database 122 (again as above explained). The device 20 may thus a configuration that matches the current user's mood 80, feelings 82, and other emotional state 120. Indeed, over time exemplary embodiments may monitor and track the sharing users' different emotional states 120, thus yielding a spectrum of household emotional usages. The members of the household may thus be individually, or collectively, characterized to improve targeted advertising and services.

Figure 14:
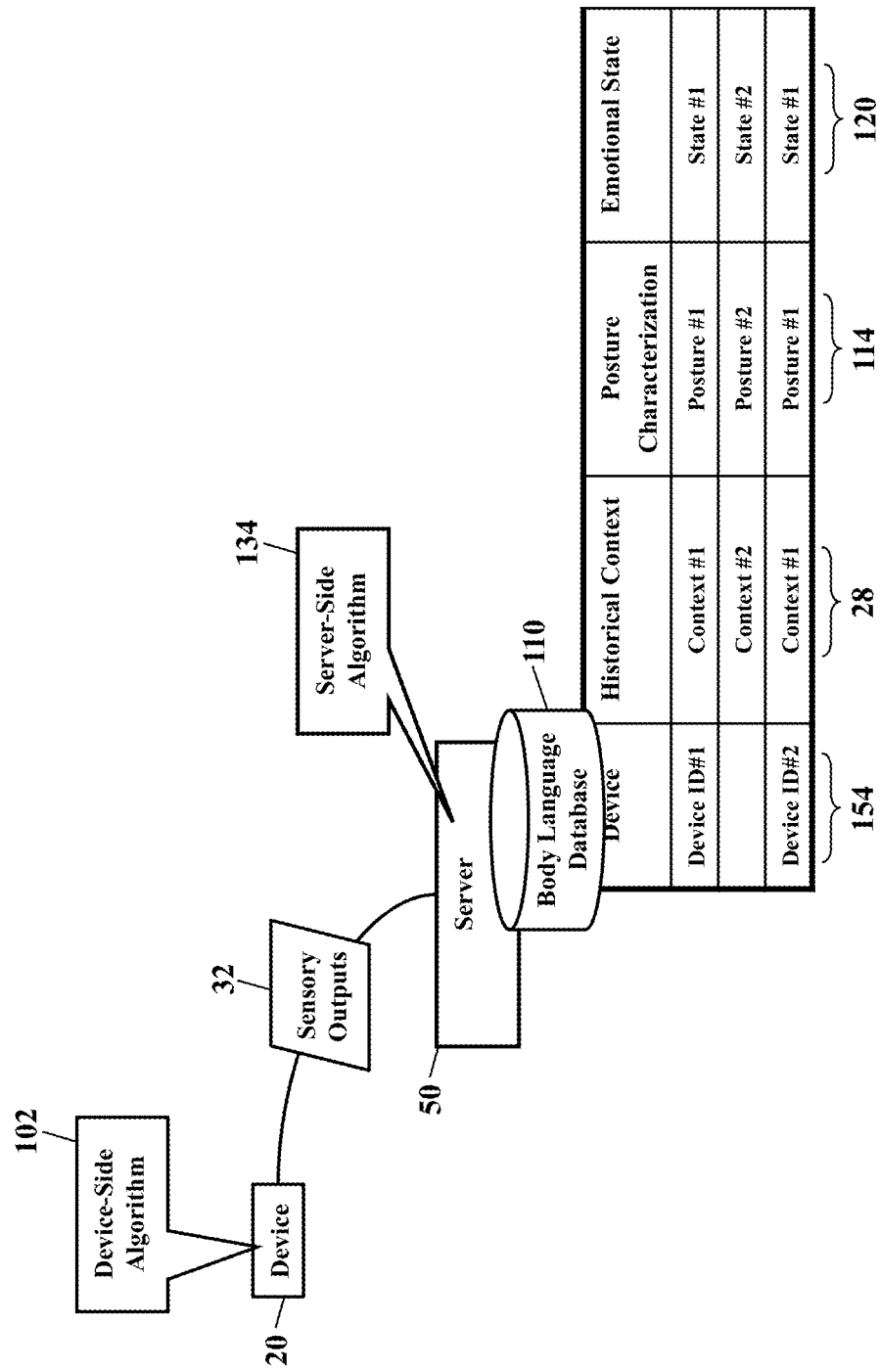
FIG. 14 is a more detailed illustration of device identification, according to exemplary embodiments.

FIG. 14 is a more detailed illustration of device identification, according to exemplary embodiments. As the user's body posture 26 and emotional state 120 are determined, the server 50 may store a historical log according to the unique device identifier 154. In a network environment, the server 50 may service many different devices for their respective user's body posture 26 and emotional state 120. The device identifier 154 may thus be used to differentiate between different devices. Whenever the user's device 20 makes any transaction (such as a query or response), the device's corresponding device identifier 154 may be sent or included. Exemplary embodiments may monitor and track body postures 26 and emotional states 120 according to the device identifier 154.

Figure 15:
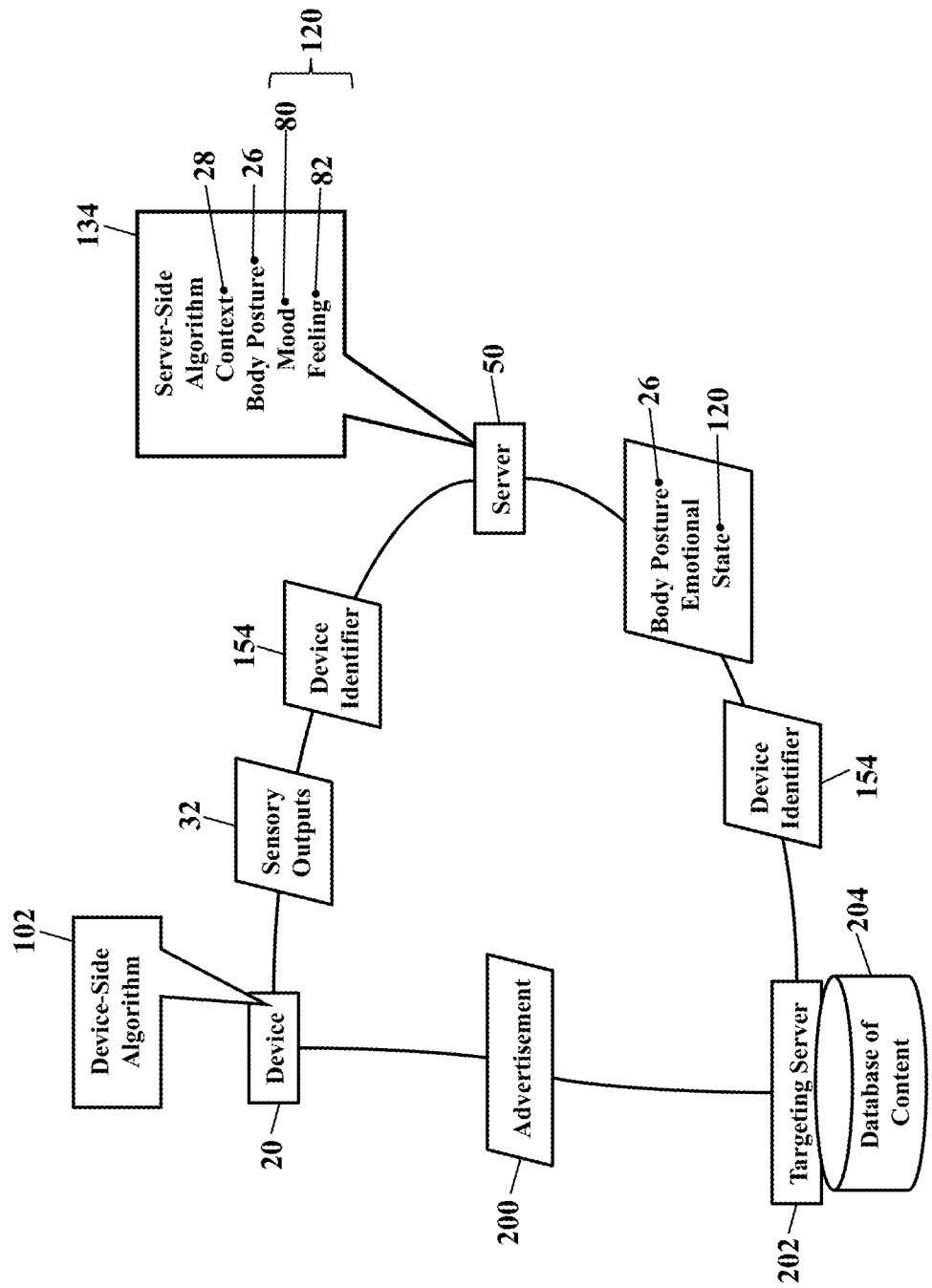
FIGS. 15-16 are schematics illustrating targeted advertising, according to exemplary embodiments.
Figure 16:
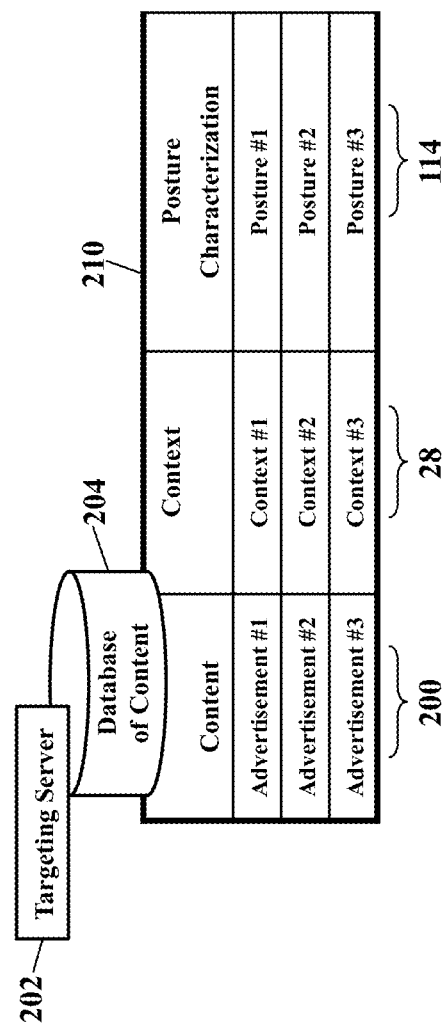

FIGS. 15-16 are schematics illustrating targeted advertising, according to exemplary embodiments. Once the user's body posture 26 and/or emotional state 120 are known, an advertisement 200 may be targeted to the user of the device 20. FIG. 15, for example, illustrates a targeting server 202. The targeting server 202 maintains a database 204 of content, such as advertisements and other promotional pieces. Whenever the user's body posture 26 and/or emotional state 120 are determined, server 50 sends them to the targeting server 202, perhaps with the device identifier 154. The targeting server 202 then retrieves the corresponding advertisement 200 for delivery to network address of the user's device 20. FIG. 16, for example, illustrates the database 202 of content as another table 210 that maps, relates, or associates different advertisements 200 to different body postures 26 and/or emotional states 120. Once the body posture 26 and/or the emotional state 120 is provided, the database 202 of content is queried for a match and the corresponding advertisement 200 is retrieved. The "slouching" body posture 26, for example, may be associated with a themed advertisement 200 that provides an uplifting message. An "erect" or "upright" body posture 26 may be associated with advertisements 200 by BMW®, ROLEX®, and other affluent brands. Similarly, a "happy" or "confident" emotional state 120 may be associated with impulse purchases, such as advertisements 200 for cars, restaurants, and clothes.

Figure 17:
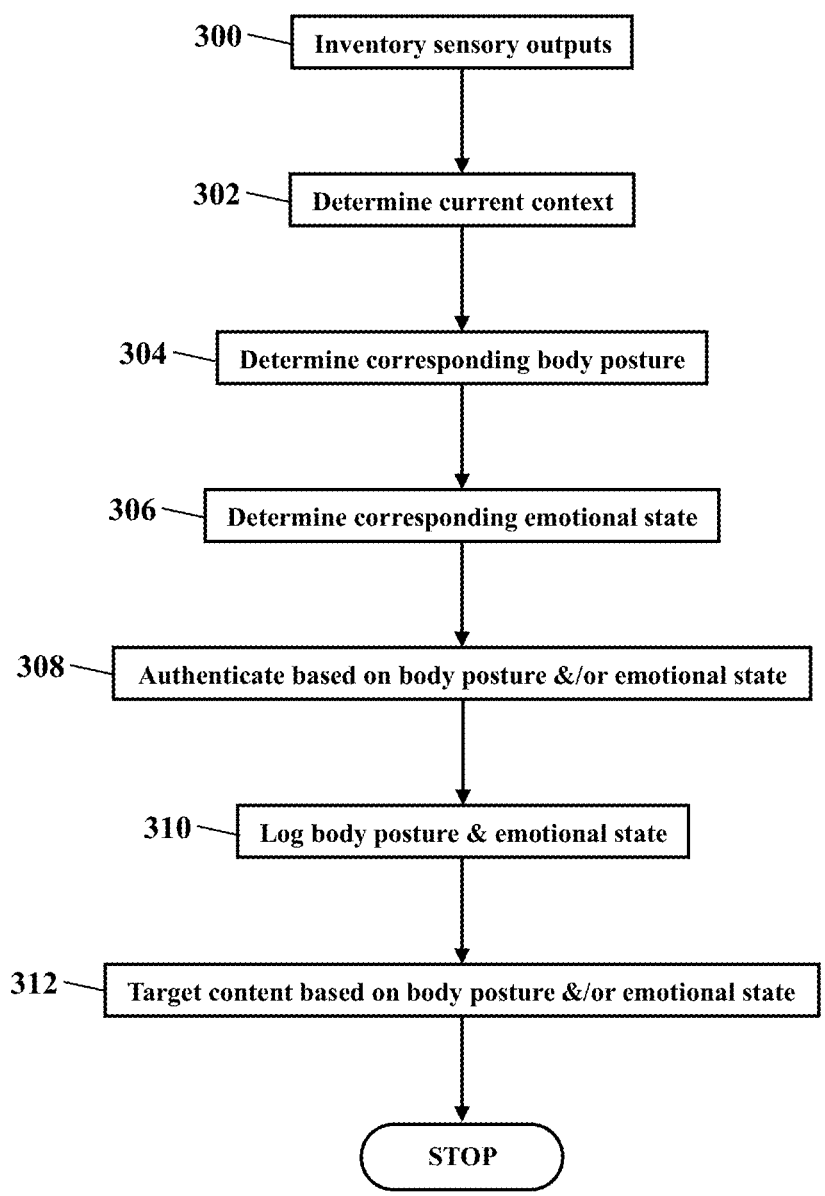
FIG. 17 is a flowchart illustrating the inference of non-verbal expressions, according to exemplary embodiments.

FIG. 17 is a flowchart illustrating the inference of non-verbal expressions, according to exemplary embodiments. An inventory of the sensory outputs 32 is obtained (Block 300) and the current context 28 is determined (Block 302). Queries are made for the corresponding body posture 26 (Block 304) and the user's emotional state 120 (Block 306). The user may be authenticated based on the body posture 26 and/or the user's emotional state 120 (Block 308). The current context 28, the body posture 26, and the emotional state 120 may be historically logged (Block 310). The advertisement 200 and other content may be targeted based on the body posture 26 and/or the user's emotional state 120 (Block 312).

Figure 18:
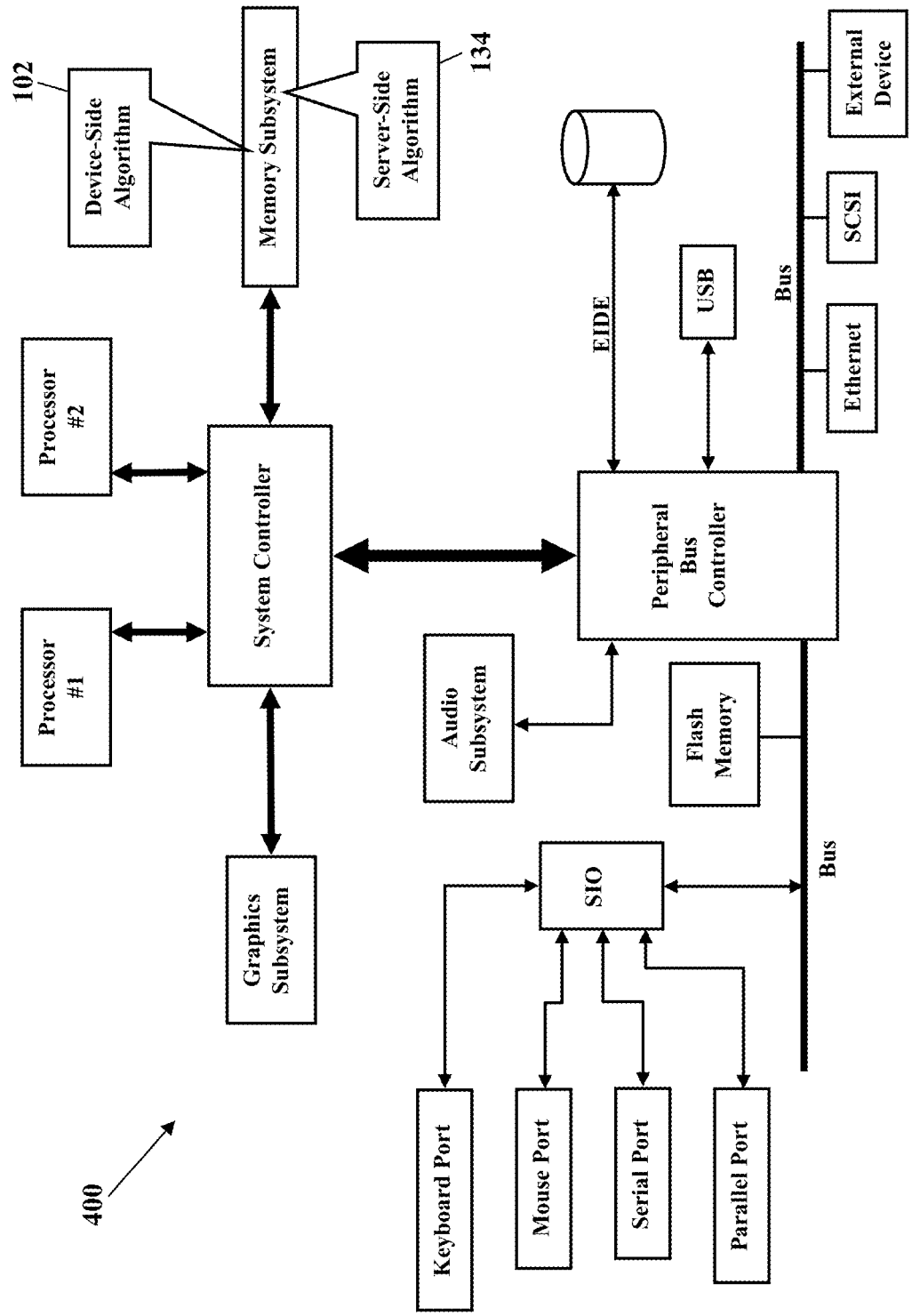
FIGS. 18-19 depict still more operating environments for additional aspects of the exemplary embodiments.

FIG. 18 is a schematic illustrating still more exemplary embodiments. FIG. 18 is a more detailed diagram illustrating a processor-controlled device 400. As earlier paragraphs explained, the device-side algorithm 102 and the server-side algorithm 134 may operate in any processor-controlled device. FIG. 18, then, illustrates the device-side algorithm 102 and the server-side algorithm 134 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 19:
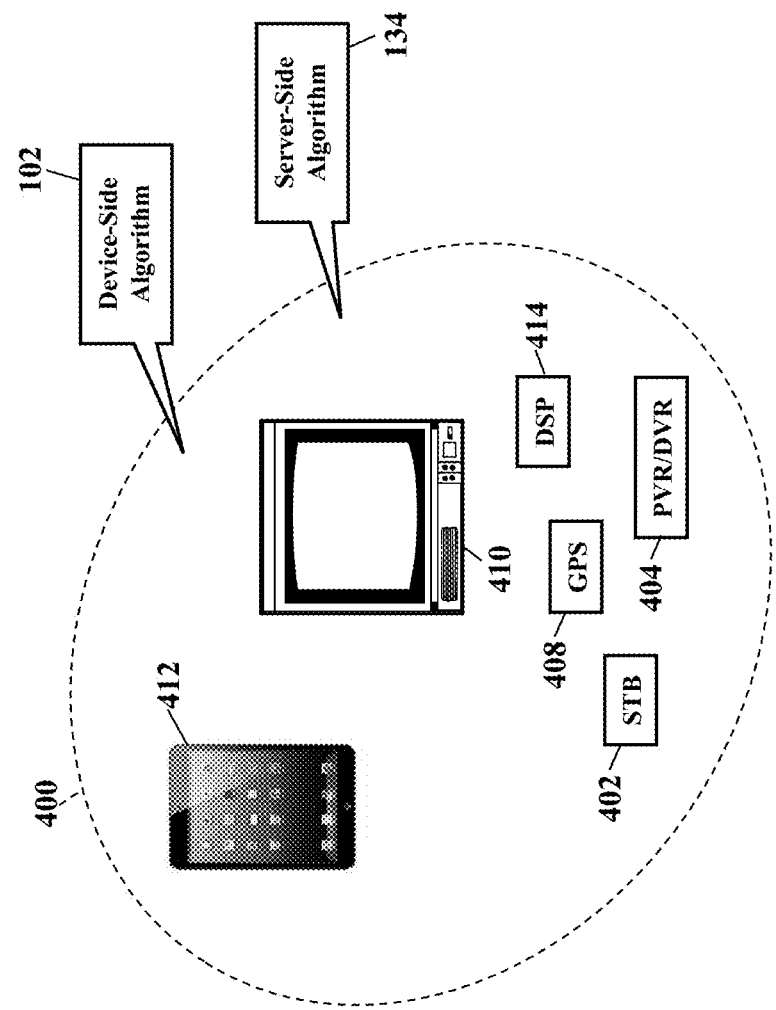

FIG. 19 depicts other possible operating environments for additional aspects of the exemplary embodiments. FIG. 19 illustrates the device-side algorithm 102 and the server-side algorithm 134 operating within various other processor-controlled devices 400. FIG. 19, for example, illustrates that the device-side algorithm 102 and the server-side algorithm 134 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor 60 and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for inference of non-verbal expressions, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
a contextual database that stores different contexts associated with their corresponding sensory outputs;
a body language database that maps the different contexts to different human body postures, at least one of the different contexts being an authentication context, and at least one of the different human body postures being an authentication body posture, the authentication body posture being a unique one of the different human body postures used for authentication purposes and being mapped with the authentication context;
an emotional database that maps the different contexts and the different human body postures to different emotional states;
a processor; and
a non-transitory memory storing instructions that when executed cause the processor to perform operations, the operations comprising:
receiving an identifier of a device;
receiving a request for authentication;
receiving a plurality of sensory outputs from the device, one of the plurality of sensory outputs pertaining to how a user is holding the device;
evaluating the plurality of sensory outputs from the device;
determining a hand orientation of a user of the device based on the evaluating;
inferring a forearm orientation, a shoulder orientation, a torso orientation, and a head orientation of the user based on the hand orientation of the user of the device;
determining, using the plurality of sensory outputs evaluated, a current context associated with a time and a location of the identifier of the device, wherein the determining the current context includes querying, using the plurality of sensory outputs, the contextual database for determining whether there is a matching different context with the plurality of sensory outputs, and if a matching entry is found, retrieving the matching different context;
inferring a corresponding body posture and an emotional state from the current context by:
querying, using the current context and the hand orientation, the forearm orientation, the shoulder orientation, the torso orientation, and the head orientation of the user of the device, the body language database for determining whether there is a matching different human body posture, and if a matching entry is found, retrieving the matching different human body posture; and
querying, using the current context and the corresponding body posture inferred, the emotional database for determining whether there is a matching emotional state, and if a matching entry is found, retrieving the matching emotional state;
querying the body language database for determining whether there is a matching entry based on matching the corresponding body posture inferred and the authentication body posture; and
if the matching entry is found, authenticating the device then:
transmitting the corresponding body posture and the emotional state inferred; and
receiving, in response to the transmitting the corresponding body posture and the emotional state inferred, a product recommendation selected based on at least one of the corresponding body posture and the emotional state inferred.

2. The system of claim 1, wherein the system further comprises:
an e-commerce server for determining the product recommendation selected.

3. The system of claim 2, wherein the operations further comprise:
transmitting the identifier of the device to the e-commerce server.

4. The system of claim 1, wherein the corresponding body posture inferred indicates a lower back ailment, and the product recommendation includes one of a heating pad, a pillow, a chair, and a medication.

5. The system of claim 1, wherein the emotional state inferred indicates one of a stress and a sadness, and the product recommendation is one of a movie, a book and a counseling service.

6. The system of claim 1, wherein the operations further comprise retrieving an advertisement associated with the one of the different human body postures.

7. The system of claim 1, wherein the operations further comprise receiving the authentication body posture.

8. A method, comprising:
maintaining, in a memory, a contextual database that stores different contexts associated with their corresponding sensory outputs;
maintaining, in the memory, a body language database that maps the different contexts to different human body postures, at least one of the different contexts being an authentication context, and at least one of the different human body postures being an authentication body posture, the authentication body posture being a unique one of the different human body postures used for authentication purposes and being mapped with the authentication context;
maintaining, in the memory, an emotional database that maps the different contexts and the different human body postures to different emotional states;
receiving an identifier of a device;
receiving a request for authentication;
receiving a plurality of sensory outputs from the device, one of the plurality of sensory outputs pertaining to how a user is holding the device;
evaluating the plurality of sensory outputs from the device and, using the plurality of sensory outputs evaluated, determining, by a processor, a hand orientation of a user of the device and a current context associated with a time and a location of the identifier of the device, wherein the determining the current context includes querying, using the plurality of sensory outputs, the contextual database for determining whether there is a matching different context with the plurality of sensory outputs, and if a matching entry is found, retrieving the matching different context;

inferring a forearm orientation, a shoulder orientation, a torso orientation, and a head orientation of the user based on the hand orientation of the user of the device:

inferring a corresponding body posture and an emotional state from the current context by:

querying, using the current context and the hand orientation, the forearm orientation, the shoulder orientation, the torso orientation, and the head orientation of the user of the device, the body language database for determining whether there is a matching different human body posture, and if a matching entry is found, retrieving the matching different human body posture; and querying, using the current context and the corresponding body posture inferred, the emotional database for determining whether there is a matching emotional state, and if a matching entry is found, retrieving the matching emotional state;

determining whether there is a matching entry based on matching the corresponding body posture inferred and the authentication body posture;

and if the matching entry is found, authenticating the device then:

transmitting the corresponding body posture and the emotional state inferred; and receiving, in response to the transmitting the corresponding body posture and the emotional state inferred, a product recommendation selected based on at least one of the corresponding body posture and the emotional state inferred.

9. The method of claim 8, further comprising:
receiving, by an e-commerce server, the corresponding body posture and the emotional state inferred; and
selecting, by the e-commerce server, the product recommendation based on the at least one of the corresponding body posture and the emotional state inferred.

10. The method of claim 9, further comprising:
transmitting the identifier of the device to the e-commerce server.

11. The method of claim 8, wherein the corresponding body posture inferred indicates a lower back ailment, and the product recommendation includes one of a heating pad, a pillow, a chair, and a medication.

12. The method of claim 8, wherein the emotional state inferred indicates one of a stress and a sadness, and the product recommendation is one of a movie, a book and a counseling service.

13. The method of claim 8, further comprising retrieving an advertisement associated with the one of the different human body postures.

14. The method of claim 8, further comprising receiving the authentication body posture.

15. A non-transitory memory storing instructions that when executed cause a processor to perform operations, the operations comprising:

maintaining, in a memory, a contextual database that stores different contexts associated with their corresponding sensory outputs;

maintaining, in the memory, a body language database that maps the different contexts to different human body postures, at least one of the different contexts being an authentication context, and at least one of the different human body postures being an authentication body posture, the authentication body posture being a unique one of the different human body postures used for authentication purposes and being mapped with the authentication context;

maintaining, in the memory, an emotional database that maps the different contexts and the different human body postures to different emotional states;

receiving an identifier of a device;

receiving a request for authentication;

receiving a plurality of sensory outputs from the device, one of the plurality of sensory outputs pertaining to how a user is holding the device;

evaluating the plurality of sensory outputs from the device and determining, using the plurality of sensory outputs evaluated, a hand orientation of a user of the device and a current context associated with a time and a location of the identifier of the device, wherein the determining the current context includes querying, using the plurality of sensory outputs, the contextual database for determining whether there is a matching different context with the plurality of sensory outputs, and if a matching entry is found, retrieving the matching different context;

inferring a forearm orientation, a shoulder orientation, a torso orientation, and a head orientation of the user based on the hand orientation of the user of the device:

inferring a corresponding body posture and an emotional state from the current context by:

querying, using the current context and the hand orientation, the forearm orientation, the shoulder orientation, the torso orientation, and the head orientation of the user of the device, the body language database for determining whether there is a matching different human body posture, and if a matching entry is found, retrieving the matching different human body posture; and querying, using the current context and the corresponding body posture inferred, the emotional database for determining whether there is a matching emotional state, and if a matching entry is found, retrieving the matching emotional state;

querying the body language database for determining whether there is a matching entry based on matching the corresponding body posture inferred and the authentication body posture; and if the matching entry is found, authenticating the device then:

transmitting the corresponding body posture and the emotional state inferred; and receiving, in response to the transmitting the corresponding body posture and the emotional state inferred, a product recommendation selected based on at least one of the corresponding body posture and the emotional state inferred.

16. The non-transitory memory of claim 15, wherein the operations further comprise:

receiving, by an e-commerce server, the corresponding body posture and the emotional state inferred; and
selecting, by the e-commerce server, the product recommendation based on the at least one of the corresponding body posture and the emotional state inferred.

17. The non-transitory memory of claim 16, wherein the operations further comprise:

transmitting the identifier of the device to the e-commerce server.

18. The non-transitory memory of claim 15, wherein the corresponding body posture inferred indicates a lower back ailment, and the product recommendation includes one of a heating pad, a pillow, a chair, and a medication.

19. The non-transitory memory of claim 15, wherein the emotional state inferred indicates one of a stress and a sadness, and the product recommendation is one of a movie, a book and a counseling service.

20. The non-transitory memory of claim 15, wherein the operations further comprise receiving the authentication body posture.

\* \* \* \* \*